United States Patent
James et al.

(10) Patent No.: US 10,293,952 B2
(45) Date of Patent: May 21, 2019

(54) PIPE INSTALLATION

(71) Applicant: Airbus Operations Limited, Bristol (GB)

(72) Inventors: Dylan James, Bristol (GB); Alan Pout, Bristol (GB)

(73) Assignee: Airbus Operations Limited, Bristol (GB)

( * ) Notice: Subject to any disclaimer, the term of this patent is extended or adjusted under 35 U.S.C. 154(b) by 272 days.

(21) Appl. No.: 15/259,901

(22) Filed: Sep. 8, 2016

(65) Prior Publication Data

US 2017/0066542 A1 Mar. 9, 2017

(30) Foreign Application Priority Data

Sep. 8, 2015 (GB) .................................. 1515860.3

(51) Int. Cl.
| | |
|---|---|
| *B64D 37/32* | (2006.01) |
| *F16L 25/01* | (2006.01) |
| *B64D 37/00* | (2006.01) |
| *B64D 45/02* | (2006.01) |
| *B64D 37/04* | (2006.01) |
| *B64D 37/06* | (2006.01) |
| *F16L 21/02* | (2006.01) |

(52) U.S. Cl.
CPC ........... *B64D 37/32* (2013.01); *B64D 37/005* (2013.01); *B64D 37/04* (2013.01); *B64D 37/06* (2013.01); *B64D 45/02* (2013.01); *F16L 21/02* (2013.01); *F16L 25/01* (2013.01)

(58) Field of Classification Search
CPC .......... F16L 25/01; F16L 21/02; B64D 37/32; B64D 37/06; B64D 37/04; B64D 37/005; B64D 45/02

USPC ............... 285/119, 302, 62; 244/131, 135 R; 361/216

See application file for complete search history.

(56) References Cited

U.S. PATENT DOCUMENTS

| | | | |
|---|---|---|---|
| 2009/0256352 A1* | 10/2009 | Petit | ........................ F16L 25/01 |
| 2010/0001512 A1 | 1/2010 | Breay et al. | |
| 2010/0003840 A1 | 1/2010 | Breay et al. | |
| 2010/0122749 A1 | 5/2010 | Bouleti et al. | |
| 2010/0226063 A1 | 9/2010 | West et al. | |
| 2012/0012709 A1 | 1/2012 | Yonezawa | |

(Continued)

FOREIGN PATENT DOCUMENTS

EP 0 269 458 6/1988

OTHER PUBLICATIONS

European Search Report cited in EP 16185573.9 dated Jan. 24, 2017, 9 pages.

(Continued)

*Primary Examiner* — Greg Binda
*Assistant Examiner* — Zachary T Dragicevich

(57) ABSTRACT

A pipe installation including conductive first and second pipes installed in a fuel tank; and a fitting which connects the first and second pipes and enables fluid to flow through the pipes via a conduit in the fitting. The fitting is attached to the first or second pipe by a flexible joint which permits relative movement between the fitting and the first or second pipe. The fitting is attached to a structure of the fuel tank. The fitting provides a path of least electrical resistance between the first or second pipe and the structure, and the path of least electrical resistance has a resistance between 50Ω and 100MΩ.

31 Claims, 6 Drawing Sheets

(56) References Cited

U.S. PATENT DOCUMENTS

2012/0057267 A1    3/2012  Petit et al.
2012/0181384 A1*  7/2012  Courpet ................ B64D 45/02
2013/0099490 A1*  4/2013  Kwon .................... B64D 37/32
2014/0246112 A1*  9/2014  Flynn ...................... F16L 25/01
2015/0276105 A1*  10/2015  Bander

OTHER PUBLICATIONS

Combined Search and Examination Report cited in GB 1515860.3 dated Feb. 19, 2016, six pages.

* cited by examiner

PIPE INSTALLATION

CROSS RELATED APPLICATION

This application claims priority to Great Britain application GB 1515860.3 filed Sep. 8, 2015, and which is incorporated by reference in its entirety.

FIELD OF THE INVENTION

The present invention relates to a pipe installation, typically although not exclusively in an aircraft fuel tank.

BACKGROUND OF THE INVENTION

U.S. Patent Application Publication 2012/0012709 describes a known supporting structure between a fuel pipe and a rib within an aircraft fuel tank. The supporting structure is provided with an insulating section which electrically insulates the pipe and the rib. This prevents a spark discharge between the pipe and the rib.

SUMMARY OF THE INVENTION

The present invention provides a pipe installation comprising: conductive first and second pipes installed in a fuel tank; and a fitting which connects the first and second pipes and enables fluid to flow through the pipes via a conduit in the fitting, wherein the fitting is attached to the first or second pipe by a flexible joint which permits relative movement between the fitting and the first or second pipe, the fitting is attached to a structure of the fuel tank, the fitting provides a path of least electrical resistance between the first or second pipe and the structure, and the path of least electrical resistance has a resistance between 50Ω and 100 MΩ.

The fitting may be attached to the structure of the fuel tank to enable load to be transferred between the pipes and the structure via the fitting, or simply to maintain the fitting in a fixed position relative to the structure of the fuel tank. The minimum electrical resistance of the fitting (50Ω) limits the flow of undesirable currents such as those induced by lightning-strike or ground loops. The maximum electrical resistance of the fitting (100 MΩ) enables desirable currents to flow, for instance to dissipate electrostatic charge. This can be contrasted with U.S. Patent Application Publication 2012/0012709 in which the very high resistance of the insulating section prevents the flow of such desirable currents. The flexible joint enables relative movement between the fitting and the first or second pipe, enabling the installation to accommodate deformations of the fuel tank—for instance caused by thermal expansion or bending or twisting of the fuel tank. This can be contrasted with U.S. Patent Application Publication 2012/0012709 in which a single pipe passes through the rib, and the pipe is rigidly gripped by a clamp so that no relative movement is permitted. The use of conductive pipes with low resistivity, rather than pipes made from a high-resistivity material such as a polymer, enables the pipes to be manufactured easily and cheaply, for instance by extrusion.

Typically the fitting provides a first path of least electrical resistance between the first pipe and the structure and the first path of least electrical resistance has a resistance between 50Ω and 100 MΩ, and the fitting also provides a second path of least electrical resistance between the second pipe and the structure and the second path of least electrical resistance has a resistance between 50Ω and 100 MΩ.

Typically the fitting comprises a body containing the conduit, and a flange extending from the body, wherein the fitting is attached to the structure of the fuel tank by the flange. Typically the flange extends radially from the body. In one embodiment the body and the flange are formed from a polymer (typically a thermoplastic polymer) mixed with conductive filler particles, and in another embodiment they are metallic.

Typically the body of the fitting passes through a hole in the structure of the fuel tank. Optionally an electrically insulating material is provided in the hole between the body of the fitting and the structure of the fuel tank. The electrically insulating material may be for example a coating on the fitting or the structure, or a gasket.

In one embodiment the fitting further comprises a resistive element (for instance a pad such as an annular gasket) between the flange and the structure, a portion of the path of least electrical resistance passes between the flange and the structure through the resistive element, and the portion of the path of least electrical resistance has a resistance between 50Ω and 100 MΩ. The resistive element may extend around only part of a circumference of the body, but more preferably it extends fully around a circumference of the body. In another embodiment the body and the flange are formed from a material with a tailored resistivity—such as a polymer mixed with conductive filler particles—and the flange is in direct contact with the structure. In this case the resistivity of the material forming the body and flange is tailored so that the path of least electrical resistance through the body and the flange has a resistance between 50Ω and 100 MΩ.

The flange may be bonded to the structure with an adhesive with a tailored resistivity giving the desired resistance between 50Ω and 100 MΩ. However more typically the flange is attached to the structure by fasteners which pass through fastener holes in the flange. Optionally each fastener comprises a metallic body, and an electrically insulating barrier between the metallic body and the flange.

The flange may extend around only part of a circumference of the body, but more preferably it extends fully around a circumference of the body. Typically the flange is annular. The flange and the body may be different parts, but more preferably they are formed integrally from a single piece of material. Optionally the flange and body are formed integrally by injection moulding.

The (or each) path of least electrical resistance may have a resistance less than 1 kΩ, but more typically it has a resistance greater than 1 kΩ, or greater than 10 kΩ and most preferably it has a resistance greater than 100 k52.

The (or each) path of least electrical resistance may have a resistance greater than 10 MΩ, but more typically it has a resistance less than 10 MΩ.

In a preferred embodiment the (or each) path of least electrical resistance has a resistance between 100 kΩ and 10 MΩ.

Optionally the conduit in the fitting has an axis, and the (or each) flexible joint permits an axial relative movement between the fitting and the first or second pipe in an axial direction parallel with the axis. This axial relative movement typically has a permitted range which is greater than 1 mm and most preferably greater than 10 mm.

Optionally the (or each) flexible joint permits a pivoting relative movement between the fitting and the first or second pipe in which an axis of the first or second pipe pivots relative to the fitting. This pivoting relative movement typically has a permitted range which is greater than 1° and most preferably greater than 2°.

The fitting optionally has a first socket which receives the first pipe, and a second socket which receives the second pipe. Alternatively the fitting may be received within the pipes.

Each conductive pipe typically has a resistance below 1Ω from end to end of the pipe, and preferably much lower.

Typically the conductive first and second pipes are metallic along their full length. For instance they may be formed from a conductive metallic material, such as Aluminium. Such materials are cheap and convenient Optionally each pipe is connected to the fitting by one or more respective metallic bonding leads. To provide redundancy in case one lead fails, two bonding leads may be provided at each pipe end. Each metallic bonding lead typically has a resistance below 1Ω, and preferably much lower.

Optionally the fitting is attached to only one of the pipes by a flexible joint, the joint with the other pipe being rigid. However more preferably the fitting is attached to the first pipe by a first flexible joint which permits relative movement between the fitting and the first pipe, and the fitting is attached to the second pipe by a second flexible joint which permits relative movement between the fitting and the second pipe.

The fuel tank may be in a fixed structure, but more typically it is a fuel tank of a vehicle such as a ship, train or aircraft.

The pipes may be for conveying hydraulic liquid or inert gas, but more preferably the first and second pipes are liquid fuel pipes, and the fitting enables liquid fuel (such as kerosene) to flow through the pipes via the conduit in the fitting.

In the case of hydraulic pipes, the pipes may have outer diameters which are less than 15 mm. However in such cases the pipes themselves are typically able to flex, so a flexible joint with the fitting may not be required. Therefore more preferably the first and second pipes have outer diameters which are greater than 15 mm, typically greater than 20 mm, and most typically greater than 50 mm.

Typically the fuel tank has at least one fuel tank wall formed from a composite material.

Typically the structure of the fuel tank to which the fitting is attached is metallic.

In a preferred embodiment the structure of the fuel tank to which the fitting is attached is a rib of an aircraft wing. The aircraft wing may comprise a primarily carbon fibre reinforced plastic construction—for instance with carbon fibre reinforced plastic skins and spars.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
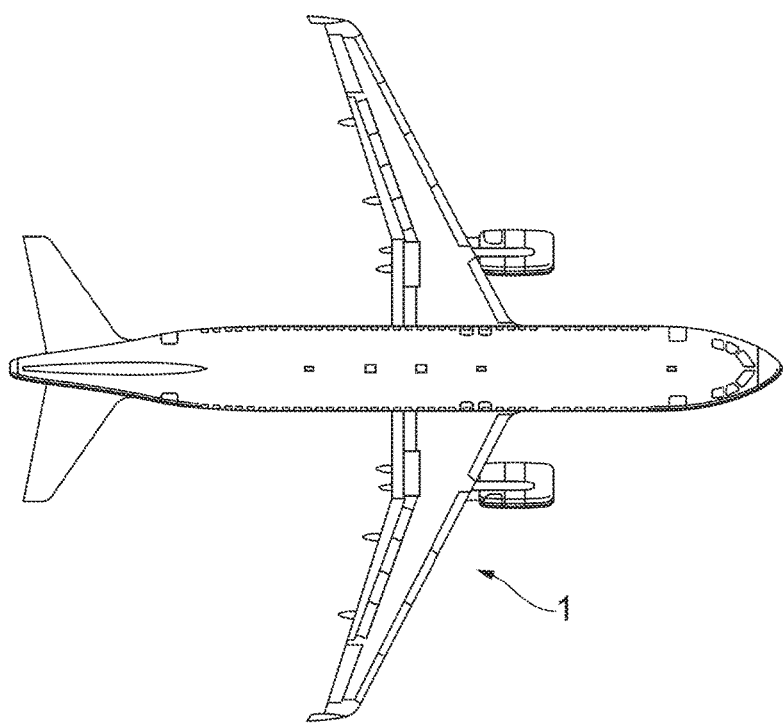
FIG. 1 is a plan view of an aircraft including an aircraft wing with a pipe installation according to an embodiment of the invention.
Figure 2:
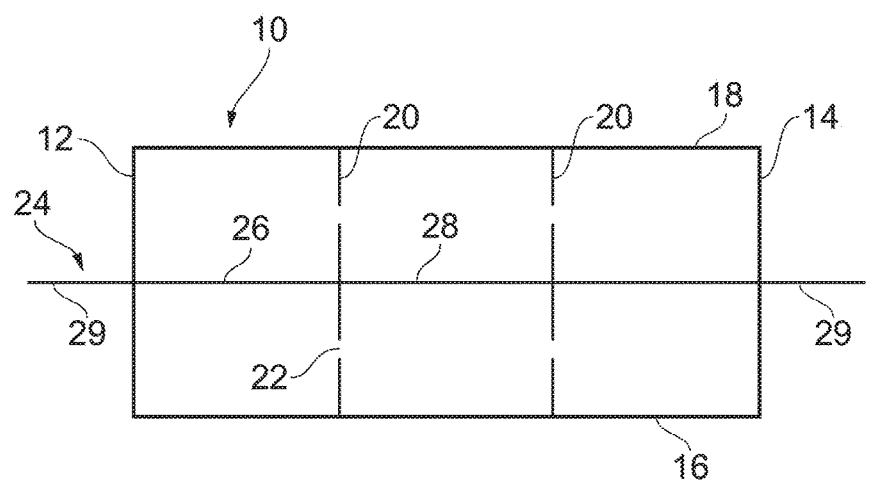
FIG. 2 is a schematic side view of a fuel tank assembly contained within the wing of the aircraft of FIG. 1.

An aircraft wing 1 shown in FIG. 1 contains a number of fuel tank assemblies, one of which is shown schematically in FIG. 2. The fuel tank assembly 10 comprises a fuel tank with fore/aft boundary walls provided by front/rear spars (not shown), inboard/outboard boundary walls provided by inboard/outboard sealed ribs 12, 14, and upper/lower boundary walls provided by upper/lower covers 16, 18. The wing also has baffle ribs 20 between the sealed ribs. The baffle ribs have holes 22 which permit fuel to flow through them. The spars and covers are formed from a composite material such as carbon-fibre reinforced epoxy resin. The ribs are formed from a metallic material such as Aluminium.

Figure 3:
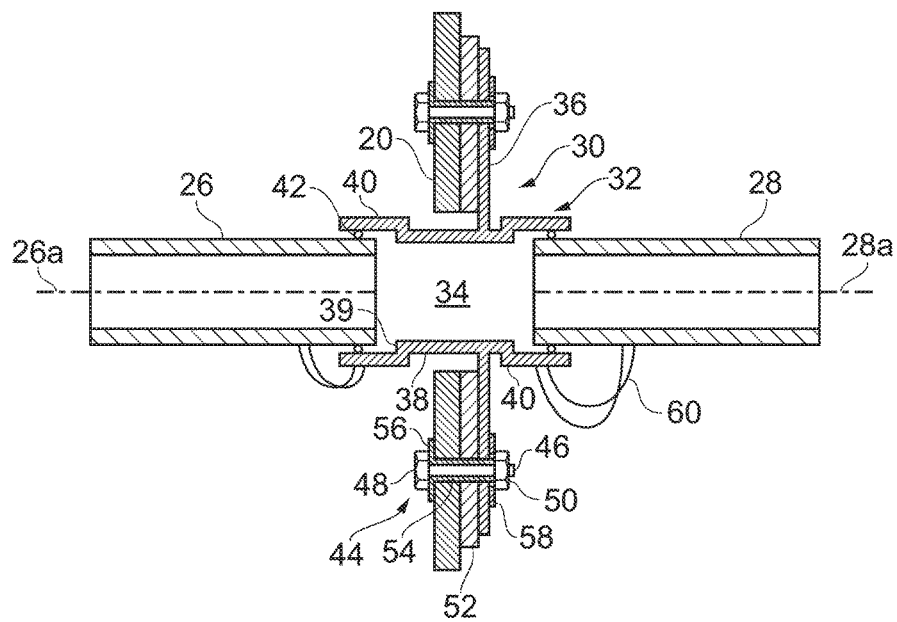
FIG. 3 is a schematic view of a pipe installation according to a first embodiment at one of the baffle ribs of FIG. 2.

A fuel pipe installation 24 is installed in the fuel tank. The pipe installation comprises a series of metallic pipes, including external pipes 29 outside the fuel tank, and internal pipes 26, 28 each extending across the width of a bay between ribs. Each pipe 26, 28 is metallic along its full length from end to end, and may be manufactured by extrusion. FIG. 3 is a detailed schematic view of the pipe installation at one of the baffle ribs 20, showing first 26 and second 28 pipes on opposite sides of the rib. Each pipe 26, 28 is metallic along its full length from the end shown in FIG. 3, to the opposite end shown in FIG. 2 where it is connected to another pipe. A fitting 30 passes through a hole in the baffle rib 20, connects the pipes 26, 28, and enables liquid fuel to flow through the pipes via a conduit 34 in the fitting.

The fitting 30 comprises a body 32 containing the conduit 34, and a flange 36 extending radially from the body. The flange 36 is annular, extending around a full circumference of the body. The body has a central section 38 passing through the hole in the baffle rib 20 with a reduced inner and outer diameter, and end sections 40 containing sockets which receive the pipes. O-rings 42 in the sockets provide a fluid-tight seal and flexible joints which permits relative movement between the fitting and the pipes.

The conduit 34 in the fitting has an axis which is co-linear with axes 26a, 28a of the pipes 26, 28. Each flexible joint permits a sliding axial relative movement between the fitting 30 and the first or second pipe 26, 28 in an axial direction parallel with the axes. This axial relative movement has a range of about 49 mm, being the distance between a shoulder 39 at the base of the socket and the rim of the socket. Each flexible joint also permits a pivoting relative movement in which the axis 26a, 28a of the first or second pipe pivots relative to the axis of the fitting 30. This pivoting relative movement has a range of the order of 4°.

In an alternative embodiment (not shown) the body of the fitting may have a "clam-shell" structure which enables the fitting to be opened up to admit the ends of the pipes, then clamped shut to couple the pipes together whilst permitting relative axial and pivoting movement between them.

The pipes are straight and rigid with outer diameters between about 20 mm and 100 mm. This makes them incapable of bending or lengthening as the wing bends or twists during flight. The flexible joints with the fitting enable relative movement between the pipes, so that the pipe installation as a whole can accommodate such bending or twisting of the wing.

The flange 36 is attached to the rib 20 by bolts 44. This rigid attachment between fitting and the rib 20 keeps the fitting centralised within the hole in the rib, and also enables loads to be transferred between the pipes 26, 28 and the rib 20 via the fitting. Each bolt has a metallic shaft 46, a metallic head 48 and a metallic nut 50. A gasket 52 is sandwiched between opposed faces of the flange 36 and the rib 20. Like the flange 36, the gasket 52 is annular and extends fully around a circumference of the body 32.

A top-hat insulating bush 54 is inserted into holes in the rib 20, gasket 52 and flange 36 with a head 56 of the bush 54 bearing against the left-hand face of the rib. The shaft 46 of the bolt 44 is then inserted until the head 48 contacts the head 56 of the bush 54. Then the nut 50 is screwed on, with an insulating washer 58 sandwiched between the nut 50 and the right-hand face of the flange. The nut 50 is tightened so that the gasket 52 is compressed between the opposed faces of the flange 36 and the rib 20.

The pipe installation 24 mitigates ignition risks as follows. One ignition risk is presented by lightning strike. If the upper 18 or lower 16 covers are made from composite material with a high electrical resistance, and the pipe installation 24 has a low electrical resistance, then large currents could flow along the pipes 26, 28 through the fuel tank 10 as a result of a lightning strike to the external surface of the wing and could pose a potential sparking hazard at the interface of the pipes 26, 28 and fitting 30. For this reason the pipe installation 24 is designed to present a path of least electrical resistance with a resistance higher than 50Ω and typically higher than 100 kΩ so that such lightning-induced currents are kept to a safe level. The pipes 26, 28 are made of Aluminium so have a very low resistance—of the order of 50 µΩ from end to end. Similarly the body 32 and flange 36 of the fitting 30 are formed from a single piece of Aluminium with a very low resistance of a similar magnitude. The pipes 26, 28 are connected to the fitting 30 by respective metallic bonding leads 60 (typically nickel-plated copper) to ensure a conductive connection between them (each metallic bonding lead having a very low resistance, of the order of less than 1 mΩ). The gasket 52 on the other hand is formed from a material with a relatively high electrical resistance—for instance PEEK polymer mixed with conductive filler particles such as carbon black. The insulating bush 54 and washer 58 are formed from an insulating material such as PEEK without any carbon black filler particles. Hence the path of least electrical resistance between the pipes 26, 28 and the rib 20 has a first portion which passes though the body 32 and the flange 36 (this first portion having a very low resistance—of the order of less than 1 mΩ) and a second portion which passes through the gasket 52 between the opposed faces of the flange and the rib, and not through any of the metallic bolts 44 (due to the insulating bush 54, 56 and washer 58). The concentration of carbon black in the gasket 52 is tailored to be sufficiently low so that the second portion of the path of least electrical resistance (i.e. the portion across the gasket) has a resistance above 50Ω and typically above 100 kΩ to ensure that currents resulting from lightning strikes are kept at an acceptable level.

Another ignition risk is electrostatic discharge. As fuel is pumped into the tank, the surface of the fuel becomes charged, and this charge could accumulate on the fuel pipes, either by direct contact with the fuel or by inducing voltage in the pipes across an air gap. It is desirable that the baffle ribs 20 provide multiple redundant paths for such charge to dissipate. For this reason the concentration of carbon black in the gasket 52 is tailored to be sufficiently high so that the path of least electrical resistance has a resistance below 100 MΩ and typically below 10 MΩ to ensure that current can flow between the pipes 26, 28 and the ribs 20 to dissipate such electrostatic charges.

Another ignition risk is ground loop currents. If a conductive object (such as a spanner) is left in the fuel tank 10 in contact with one of the pipes 26, 28, then electrical currents as a result of lightning strikes could flow through the object and along the pipe. In order to limit such ground loop currents, each fitting 30 has a relatively high electrical resistance as described above.

Figure 4:
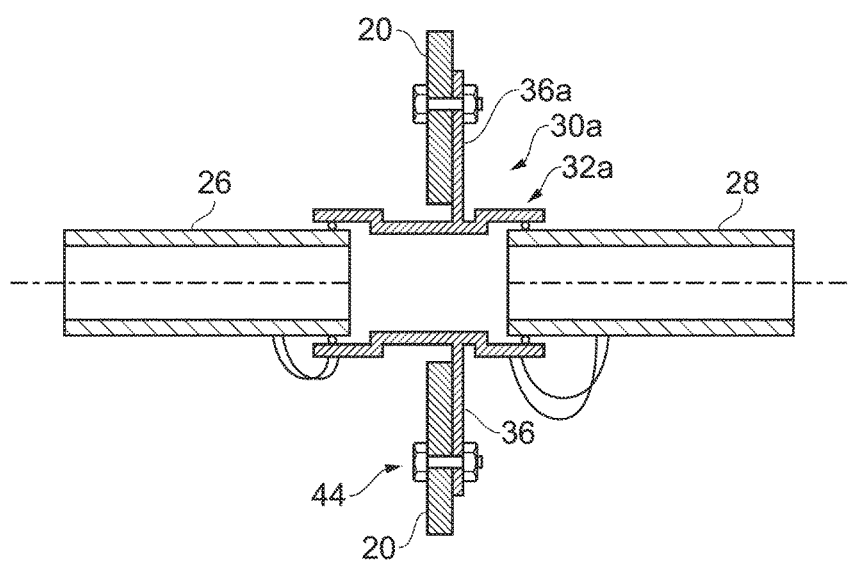
FIG. 4 is a schematic view of a pipe installation according to a second embodiment at one of the baffle ribs of FIG. 2.

FIG. 4 is a detailed schematic view of a pipe installation according to a second embodiment of the invention. Many of the features of the installation of FIG. 4 are identical to FIG. 3, and such identical features are labelled with the same reference number.

The fitting 30a in FIG. 4 has no insulating gasket, and the bolts 44 have no insulating bush or washer. The body 32a and the flange 36a are formed by injection moulding as a single piece. The injection moulding material comprises a thermoplastic polymer mixed with short-strand glass fibres (to provide mechanical strength) and electrically conductive filler particles such as carbon black. The concentration of the carbon black is tailored so that the path of least electrical resistance through the body 32a and flange 36a of the fitting between the pipes 26, 28 and the rib 20 has a resistance at a desired value. Similar resistance values to those described above can be achieved across the fitting 30a—i.e. between 50Ω and 10 MΩ—to mitigate ignition risks.

Figure 5:
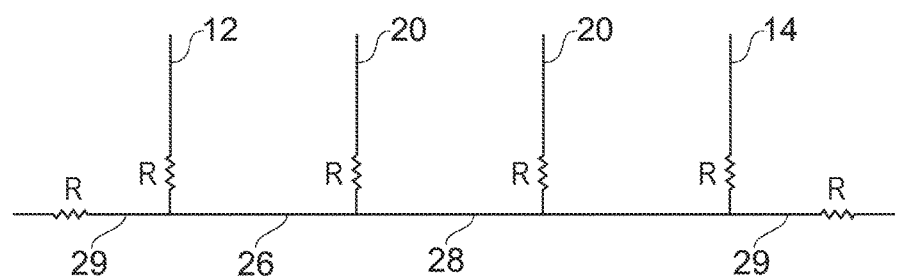
FIG. 5 is an electrical circuit for the first embodiment.
Figure 6:
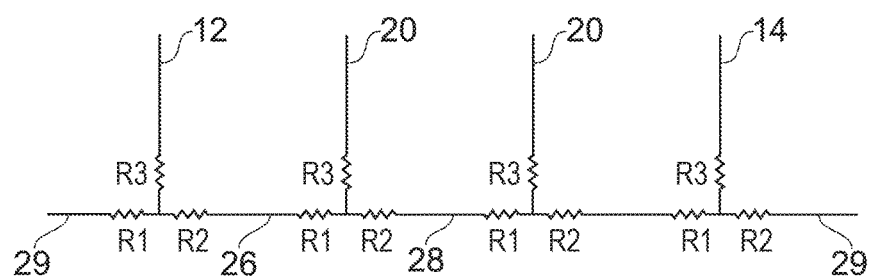
FIG. 6 is an electrical circuit for the second embodiment.

FIGS. 5 and 6 represent the embodiments of FIGS. 3 and 4 respectively as electric circuits. In the embodiment of FIG. 3 each fitting 30 provides a path of least electrical resistance between the first or second pipe (26 or 28) and the structure (12, 20 or 14) and this path of least electrical resistance has a resistance R which is between 50Ω and 100 MΩ. However the fittings 30 provide negligible electrical resistance between adjacent coupled pipes. For this reason, the external pipes 29 outside the fuel tank at either end are formed from a highly resistive material, rather than metal, so as to provide a high resistance path to prevent hazardous currents flowing into the entire pipe run. Alternatively the external pipes 29 may be metallic but incorporate a highly resistive element for the same purpose.

In the embodiment of FIG. 4 the body and flange of each fitting 30a provides a path of least electrical resistance between the first or second pipe (26, 28 or 29) and the structure (12, 20 or 14), and this path of least electrical resistance has a resistance (R1+R3) or (R2+R3) which is between 50Ω and 100 MΩ. The body of each fitting 30a also provides a path of least electrical resistance between the first pipe and the second pipe, and this path of least electrical resistance has a resistance (R1+R2) which is also between 50Ω and 100 MΩ. In this case, unlike in the example of FIG. 5, the external pipes 29 outside the fuel tank can be metallic since the fitting 30a presents a high resistance path (R1+R2) into the fuel tank from the external pipe 29.

A further source of ignition risk is arcing or surface tracking between the body of the fitting 30 and the baffle rib 20, due to the possible presence of foreign object debris. There are various ways in which this risk can be mitigated.

The body of the fitting passes through a hole in the baffle rib 20. An electrically insulating material is provided in the hole between the body of the fitting and the circular edge of the baffle rib 20, and examples are shown in FIGS. 7-9.

Figure 7:
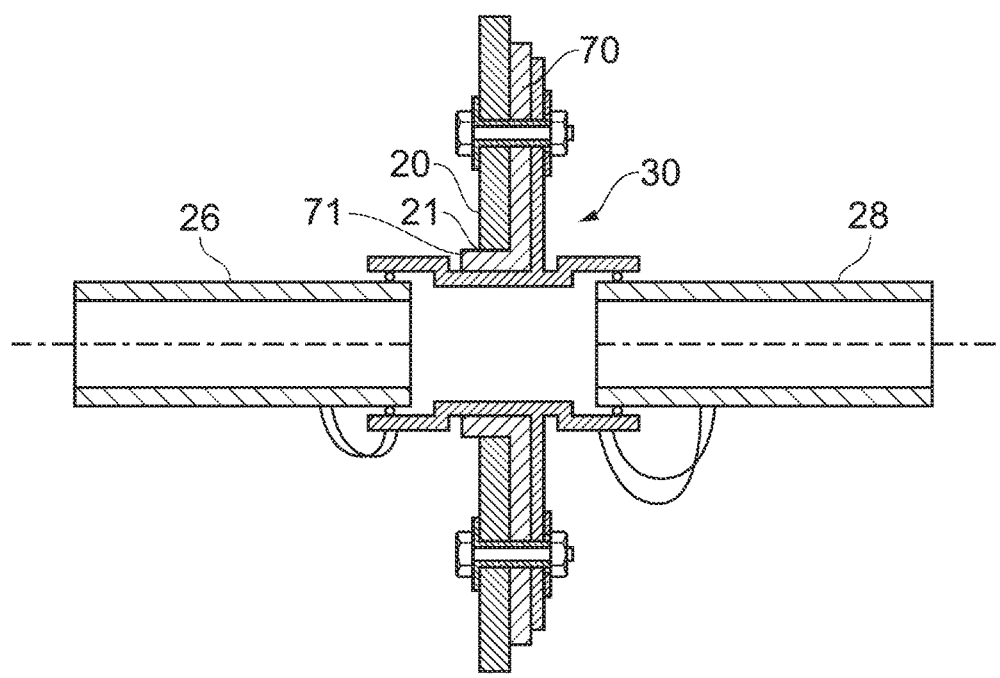
FIG. 7 is a schematic view of the pipe installation of FIG. 3 showing an extended, flanged gasket.

FIG. 7 shows the pipe installation of FIG. 3 having a gasket 70 which is flanged and extended relative to the gasket 52 of FIG. 3. Whereas the gasket 52 of FIG. 3 ends at the diameter of the hole through the baffle rib 20, the gasket 70 of FIG. 7 extends into the hole between the baffle rib 20 and the fitting 30. The gasket 70 contacts the outer diameter of the fitting 30 and the edge of the rib 20, and has a perpendicular flange or bush 71 located at the inner diameter of the gasket 70 and extending at least partially along the outer diameter of the fitting 30 to a point at or beyond the edge 21 of the rib 20.

Figure 8:
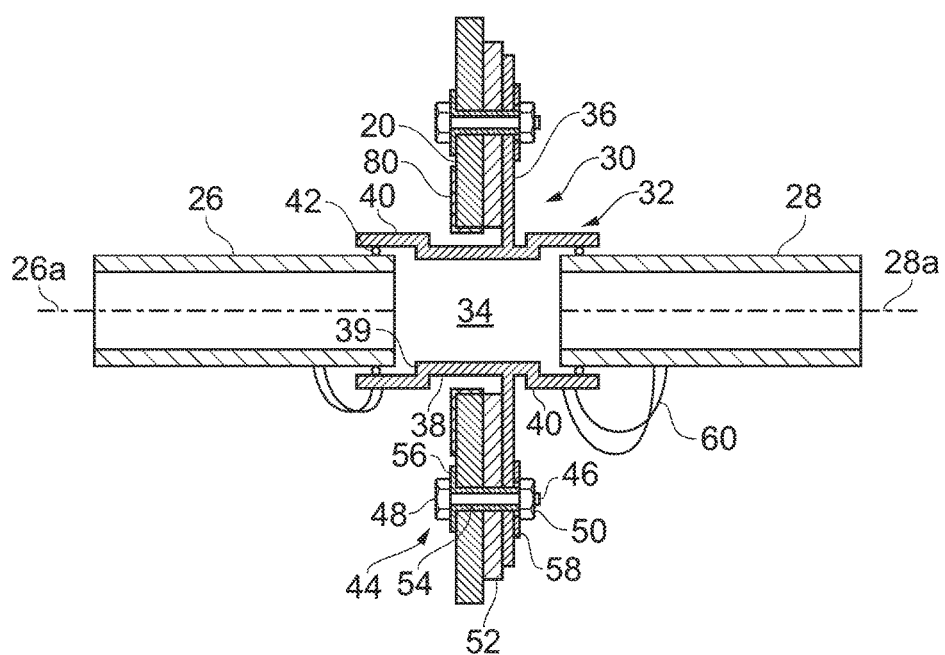
FIG. 8 is a schematic view of the pipe installation of FIG. 3 having an insulating coating on the baffle rib.
Figure 9:
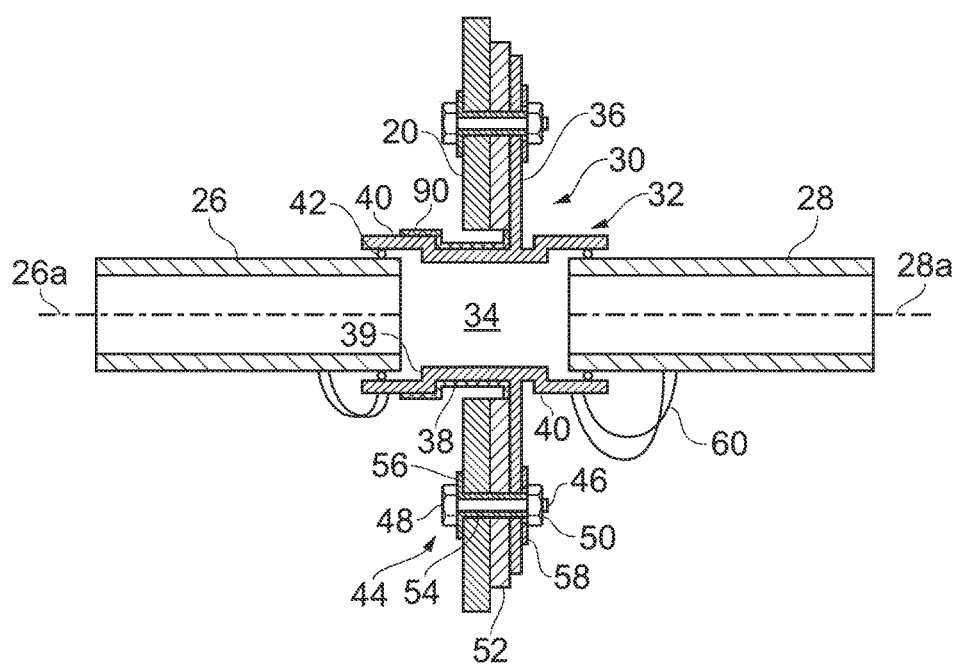
FIG. 9 is a schematic view of the pipe installation of FIG. 3 having an insulating coating on the external surface of the fitting.

Alternatively, as shown in FIGS. 8 and 9, an electrically insulating coating (typically a painted coating such as top coat paint) can be added to either the rib 20 or the outer diameter of the fitting 30, or potentially to both rib 20 and fitting 30. FIG. 8 shows the pipe installation of FIG. 3 with an electrically insulating coating 80 on the rib 20, and FIG. 9 shows the pipe installation of FIG. 3 with an electrically insulating coating 90 on the external surface of the fitting 30. In the embodiment shown in FIG. 4 where the fitting provides the resistive functionality and no gasket 52, 70 is present, an insulating coating 80 and/or 90 can be applied as shown in FIGS. 8 and 9.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A pipe installation comprising:
conductive first and second pipes installed in a fuel tank; and
a fitting which connects the first and second pipes and enables fluid to flow through the pipes via a conduit in the fitting,
wherein the fitting is attached to the first or second pipe by a flexible joint which permits relative movement between the fitting and the first or second pipe,
the fitting is attached to a structure of the fuel tank,
the fitting provides a path of least electrical resistance between the first or second pipe and the structure, and
the path of least electrical resistance through the fitting and to the structure has a resistance between 50Ω and 100 MΩ.

2. The pipe installation of claim 1 wherein the fitting comprises a body containing the conduit, and a flange extending from the body, wherein the fitting is attached to the structure of the fuel tank by the flange.

3. The pipe installation of claim 2 wherein the body and the flange are formed from a polymer mixed with conductive filler particles, and the body and a flange have a resistance between 50Ω and 100 MΩ.

4. The pipe installation of claim 2 wherein the fitting further comprises a resistive element between the flange and the structure, a portion of the path of least electrical resistance passes between the flange and the structure through the resistive element, and the portion of the path of least electrical resistance has a resistance between 50Ω and 100 MΩ.

5. The pipe installation of claim 4 wherein the body and the flange are metallic.

6. The pipe installation of claim 2 wherein the flange is attached to the structure by fasteners which pass through holes in the flange, and the fasteners are electrically isolated from the structure and the flange.

7. The pipe installation of claim 4 wherein the flange is attached to the structure by fasteners which pass through holes in the flange, and each fastener comprises a metallic body, and an electrically insulating barrier between the metallic body and the flange which electrically isolates the metallic body from the flange and the structure.

8. The pipe installation of claim 1 wherein the path of least electrical resistance has a resistance greater than 1 kΩ.

9. The pipe installation of claim 1 wherein the path of least electrical resistance has a resistance less than 10 MΩ.

10. The pipe installation of claim 1 wherein the conduit in the fitting has an axis, and the flexible joint permits an axial relative movement between the fitting and the first or second pipe in an axial direction parallel with the axis; or
the flexible joint permits a pivoting relative movement between the fitting and the first or second pipe in which an axis of the first or second pipe pivots relative to the fitting.

11. The pipe installation of claim 10 wherein the axial relative movement has a permitted range greater than 1 mm; or
the pivoting relative movement has a permitted range greater than 1 degree.

12. The pipe installation of claim 1 wherein the fitting is a single piece component and includes a first socket which receives the first pipe, and a second socket which receives the second pipe.

13. The pipe installation of claim 1 wherein the flexible joint includes a first flexible joint which permits relative movement between the fitting and the first pipe, and a second flexible joint which permits relative movement between the fitting and the second pipe.

14. The pipe installation of claim 1 wherein the fuel tank is an aircraft fuel tank.

15. The pipe installation of claim 1 wherein the first and second pipes are liquid fuel pipes, and the fitting enables liquid fuel to flow through the pipes via the conduit in the fitting.

16. The pipe installation of claim 1 wherein the first and second pipes have outer diameters which are greater than 15 mm.

17. The pipe installation of claim 1 wherein each for the first and second pipes is connected to the fitting by a respective metallic bonding lead.

18. The pipe installation of claim 1 wherein the conductive first and second pipes are metallic.

19. The pipe installation of claim 1 wherein the conductive first and second pipes are metallic along their full length.

20. The pipe installation of claim 1, wherein the fuel tank has at least one fuel tank wall formed from a composite material.

21. An aircraft wing comprising the pipe installation of claim 1.

22. A fuel tank assembly comprising:
a fuel tank in a vehicle;
first and second conductive pipes in the fuel tank;

a fitting attached to a structure of the fuel tank and coupling the first and second conductive pipes, wherein a fluid flow path extends through the first and second conductive pipes and a passage in the fitting; and a flexible joint between the fitting and at least one of the first and second conductive pipes, wherein the flexible joint is configured to enable relative movement between the fitting and the at least one of the first and second conductive pipes;

wherein the fitting is in a path of least electrical resistance between the structure of the fuel tank and at least one of the first and second conductive pipes, wherein a portion of the path of least electrical resistance through the fitting and to the structure has an electrical resistance in a range of 50Ω to 100 MΩ.

23. The fuel tank assembly of claim 22 wherein the vehicle is an aircraft, the fuel tank is a fuel tank for a wing of the aircraft and the structure is a rib in the wing of the aircraft.

24. The fuel tank assembly of claim 22 wherein the fitting is a single piece fitting, and the single piece fitting includes a conduit defining the passage through the fitting and a flange extending outward from the conduit, wherein the flange has a flange surface configured to abut a fuel tank surface of the structure of the fuel tank, and the conduit includes a first open end configured to connect to an end of the first conductive pipe and a second open end configured to connect to an end of the second conductive pipe.

25. The fuel tank assembly of claim 24 further comprising a gasket between the flange surface and the fuel tank surface, wherein the gasket is in the path of least electrical resistance and the gasket is formed of a polymer with conductive filler particles.

26. The fuel tank assembly of claim 25 wherein the gasket includes an opening configured to receive the conduit, and at least one of surface of the opening in the gasket or a surface of the conduit adjacent the opening is coated with an insulating coating.

27. The fuel tank assembly of claim 22 wherein the fitting is formed of a polymer including conductive filler particles and the fitting has a resistance between 50Ω to 100 MΩ.

28. The fuel tank assembly of claim 22 wherein the fitting is a single piece fitting formed of a material having an electrical resistance in the range of 50Ω to 100 MΩ.

29. The fuel tank assembly of claim 22 further comprising a gasket sandwiched between the fitting and the structure of the fuel tank, wherein the gasket has an electrical resistance in the range of 50Ω to 100 MΩ and the gasket is in the path of least electrical resistance.

30. The fuel tank assembly of claim 29 wherein the fitting is formed of a metallic conductive material.

31. A fuel tank assembly comprising:

a fuel tank in a vehicle;

first and second conductive pipes in the fuel tank;

a fitting attached to a structure of the fuel tank and coupling the first and second conductive pipes, wherein a fluid flow path extends through the first and second conductive pipes and a passage in the fitting;

a flexible joint between the fitting and at least one of the first and second conductive pipes, wherein the flexible joint is configured to enable relative movement between the fitting and the at least one of the first and second conductive pipes;

a path of least electrical resistance between the structure of the fuel tank and at least one of the first and second conductive pipes, wherein the path of least electrical resistance includes a path through the fitting and the path of least electrical resistance in a range of 50Ω to 100 MΩ, and a gasket between the flange surface and the fuel tank surface, wherein the gasket is in the path of least electrical resistance and the gasket is formed of a polymer with conductive filler particles;

wherein the fitting includes a conduit defining the passage through the fitting and a flange extending outward from the conduit, wherein the flange has a flange surface configured to abut a fuel tank surface of the structure of the fuel tank, and the conduit includes a first open end configured to connect to an end of the first conductive pipe and a second open end configured to connect to an end of the second conductive pipe, and wherein the gasket includes an opening and a flange on the opening, and the flange of the gasket abuts an outer surface of the conduit.

* * * * *